Oct. 21, 1947.    E. DANNER    2,429,220
APPARATUS FOR THE MANUFACTURE OF GLASSWARE
Original Filed Aug. 17, 1943    2 Sheets—Sheet 1

INVENTOR
Edward Danner

Oct. 21, 1947.   E. DANNER   2,429,220
APPARATUS FOR THE MANUFACTURE OF GLASSWARE
Original Filed Aug. 17, 1943   2 Sheets-Sheet 2
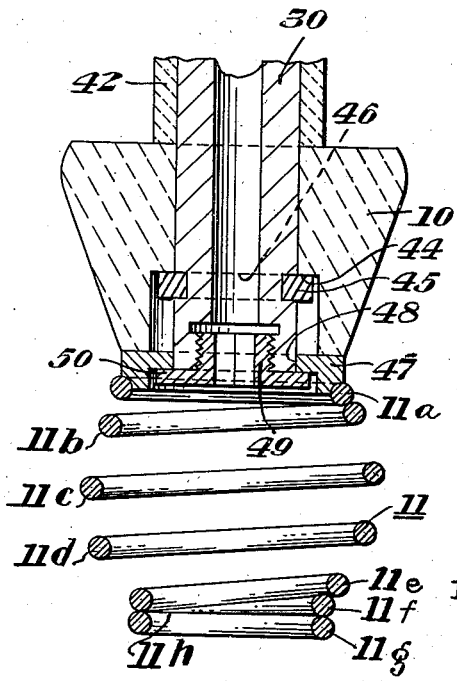
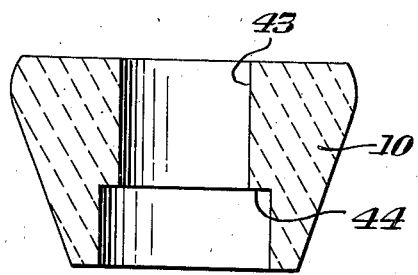
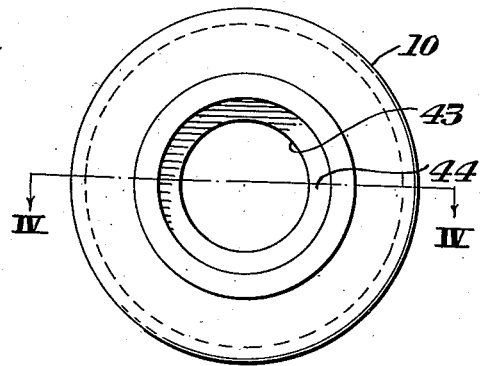
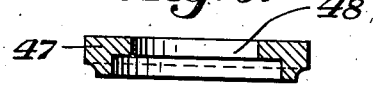
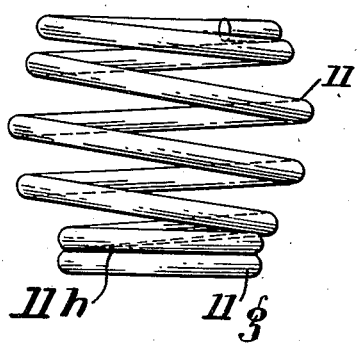
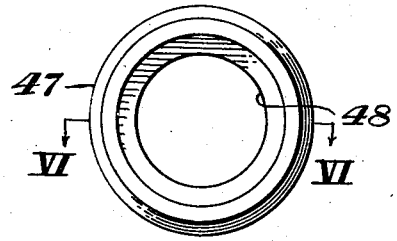
INVENTOR
Edward Danner Patented Oct. 21, 1947

2,429,220

UNITED STATES PATENT OFFICE 2,429,220

APPARATUS FOR THE MANUFACTURE OF GLASSWARE

Edward Danner, Newark, Ohio

Original application August 17, 1943, Serial No. 498,971. Divided and this application October 2, 1944, Serial No. 556,768

13 Claims. (Cl. 49—17.1)

The present invention relates to the manufacture of glassware, and more particularly to apparatus for forming hollow glassware such as glass tubing and the like. While my invention is particularly adapted to the manufacture of glass tubing having a solid cylindrical wall, it is equally applicable to the manufacture of tubing formed of cellular glass and to the manufacture of tubing having other than a cylindrical configuration.

The present application is a division of my copending application Serial No. 498,971, filed August 17, 1943, which is a continuation-in-part of my application Serial No. 235,300, filed October 17, 1938.

Heretofore considerable difficulty has been experienced in the manufacture of glass tubing due to the fact that drawing lines are imparted to the finished product by the shaping apparatus. It has been necessary to exercise great care in the operation of tube-making apparatus in order to minimize such drawing lines. Moreover, the forming rate has been relatively slow, with the result that manufacturing costs have been high. The present invention overcomes these deficiencies in the apparatus employed at the present time and provides an apparatus whereby high-quality tubing can be manufactured at a relatively high forming speed and at appreciably lower manufacturing costs.

In accordance with the present invention, I provide apparatus employing a novel shaping element over which the molten glass passes as it is being formed into ware. The shaping element of my invention is of such character that the molten glass is repeatedly intercepted during its downward travel and permitted to repeatedly flow freely between the intercepting portions of the element. At the same time, due to the character of the shaping element which I provide, the molten glass is intermixed and, consequently, uniformity of temperature in any horizontal cross-section of the glass and also a rapid reduction of the temperature of the glass as it progresses from the upper end to the lower end of the shaping element are obtained. This produces uniform drawing temperatures within a short distance of travel and, in large measure, prevents devitrification of the glass.

The avoidance of devitrification in the drawing of glass tubing or, for that matter, in the manufacture of glass products generally is important. Devitrification occurs when the glass moves slowly, as when it moves in contact with glass-shaping bodies having surfaces of substantial length. It can be prevented only by accurate heat regulation, which naturally requires close attention to the changing condition of the molten glass. As is well known, the adhesion of glass to bodies other than glass is characteristically high and, consequently, movement of the glass over such foreign bodies is greatly retarded. The adhesion of the glass permits those portions slightly remote from the surfaces of the foreign bodies to move only somewhat faster than the glass in contact with the surfaces of the shaping element. The outer or surface glass thus moves over the inner glass, but, because of its adhesion, it moves at a relatively slow rate. To produce a required drawing viscosity of the glass, it is necessary to cool the glass and, since the molten glass at the surfaces of the shaping element remains in the cooler region for a much longer period, it tends to devitrify. This devitrification increases and rapidly grows into the outer layers of glass, with the result that fragile and imperfect glassware is formed.

Where the molten glass moves over a large shaping element, which is the case in the presently known types of apparatus, due to the conditions mentioned above, it is not possible to move the whole body of glass at a uniform speed to the ware-forming point; that is, the locus where the glass is discharged from the lower end of the shaping element. In the glass-shaping element of the present invention vertically spaced glass-adherent surfaces are provided. These glass-adherent surfaces are relatively thin and are spaced apart some distance so that the area of contact between the shaping element and the glass is relatively small as compared to the total volume of glass passing over the element at any given time. As the glass passes downwardly over the shaping element, it is alternately interrupted or retarded and permitted to flow freely by gravity. Moreover, the adjacent glass-adherent surfaces of the shaping element may be spaced relatively to a sufficient extent to assist in providing substantial intermixing of the glass as it passes thereover.

In the accompanying drawings I have shown, for purposes of illustration only, a preferred embodiment of the present invention. In the drawings, Figure 1 is a vertical, longitudinal section, partly broken away, showing glass-drawing apparatus embodying my invention;

Figure 2 is an enlarged vertical section through the glass-shaping element of my invention and the supporting structure;

Figure 3 is an elevational view of the element shown in Figures 1 and 2;

Figure 4 is a section taken along the line IV—IV of Figure 5 and illustrating the block over which the glass passes as it is delivered to the shaping element;

Figure 5 is an inverted plan view of the block shown in Figure 4;

Figure 6 is a sectional view along the line VI—VI of Figure 7, showing the ring for supporting the shaping element; and Figure 7 is an inverted plan view of the ring shown in Figure 6.

Figure 1:
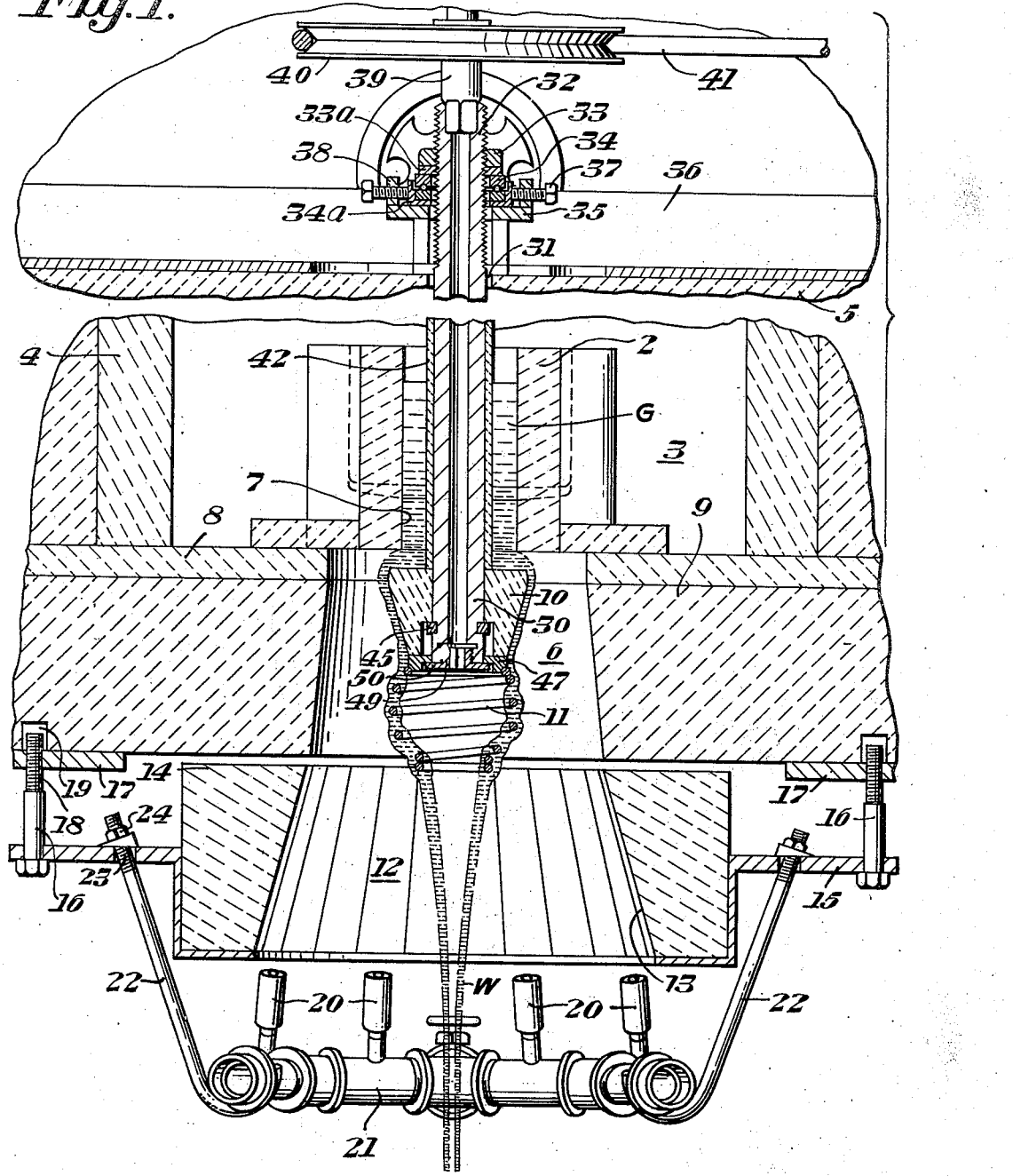

In the apparatus shown in the drawings, the molten glass G is delivered from the melting portion of a glass tank to a trough 2 mounted in the glass delivery chamber 3 formed of side walls 4 and a top wall 5. The molten glass is delivered from the trough 2 to the shaping chamber 6 through an opening 7 in the bottom thereof. The shaping chamber 6 has an opening in the bottom wall 8 of the chamber 3 and the refractory block 9 positioned immediately below the wall 8. The glass flows downwardly through the opening 7 in the trough onto a block 10 positioned beneath the opening 7 and above the shaping element 11. The glass passes downwardly around the block 10 along the outer surface thereof and then passes over the shaping element 11 which is positioned below said block. It then passes from the shaping element and, when it does so, it is in ware form, although, as is understood in this art, the diameter of the formed ware decreases somewhat after it passes beyond the shaping element. The formed ware W is received by suitable handling mechanism which is well known in this art.

Beneath the shaping chamber 6 there is an auxiliary shaping chamber 12 in the form of a frusto-conical opening 13 in an adjustable block 14. The block 14 is positioned so that the opening 13 is in axial alignment with the chamber 6. This block 14 is carried on framework 15 which is supported on bolts 16 which are threaded into plates 17 which form a part of the furnace structure. The bolts 16 are provided with threaded portions 18 of substantial length and the ends of which extend into recesses 19 in the block 9 so as to permit vertical adjustment of the block 14 relative to the block 9. The block 14 is normally spaced a short distance from the bottom of the block 9 so as to provide an area through which heated or cooled gases, which may be utilized and caused to pass upwardly through the block 12, can pass from the apparatus.

A plurality of burners 20 are located beneath the block 14. These burners are mounted on and are in communication with a header 21 which is generally circular and is mounted below the opening 13 in the block 14. The header 21 is supported on rods 22 carried by the framework 15. The ends 23 of the rods 22 are threaded and cooperate with nuts 24, whereby the header and the burners thereon may be raised or lowered in accordance with the desired operating conditions. These burners 20 may be utilized to play a flame or heated gases against the ware after it leaves the shaping element or while it is on the shaping element and the block 10 positioned thereabove.

The block 10, which is positioned in the path of the glass discharged through the opening 7 in the trough, is supported on a blow pipe 30 which is utilized for blowing air interiorly of the downwardly flowing glass as it passes over the shaping element 11. The lower end of the blow pipe 30 is positioned within the chamber 6 and the pipe extends upwardly through the opening 7 in the trough and through the chamber 3 and through an opening 31 in the top wall 5. The upper end 32 of the blow pipe is threaded for cooperation with internally threaded nuts 33 and 33a. These nuts rest upon the supporting ring of a ball bearing 34 which, in turn, is supported on carrier members 34a supported by the plate 35. The plate 35 is carried by a supporting member 36. Screws 37 are provided for adjusting the pipe 30 and the glass-shaping element laterally of the orifice or opening through which the glass flows downwardly just before being formed into ware. The adjusting screws 37 are carried by the plate 35 and are threaded through vertically extending arms 38 thereon. This arrangement for supporting the pipe 30 also permits vertical adjustment thereof. The nuts 33 and 33a may be threaded upwardly or downwardly along the threaded end, and this raises or lowers the pipe and the shaping element carried thereby.

The upper end of the pipe 30 is connected with a hollow member 39 which carries a pulley wheel 40 driven by a belt 41, whereby the pipe and the shaping element may be rotated if desired.

The blow pipe 30 is of metal and, since it extends downwardly through the molten glass, it is desirable to protect it. Consequently, a refractory sleeve 42 surrounds that portion of the blow pipe between the block 10 and the upper end of the chamber 3.

The block 10, which is, in fact, a part of the shaping apparatus, has a centrally disposed opening 43 therein so that it can be placed around the lower end of the blow pipe beyond the end of the refractory sleeve 42. The diameter of the opening 43 is greater at the bottom end of the block than at the upper end so as to provide a shoulder 44 which cooperates with a split ring 45 which is positioned in the recess 46 in the blow pipe. In this manner the block 10 is removably secured to the blow pipe.

The upper end of the block 10 is of a diameter slightly greater than the diameter of the opening 7 in the trough. Vertical adjustment of the block 10, consequently, provides a control over the rate of delivery of glass to the shaping element.

The upper turn 11a of the shaping element 11 is welded or otherwise suitably secured to a ring 47 having a centrally disposed opening 48 therein. This ring is secured to the blow pipe in abutting relation with respect to the bottom end of the block 10 by means of a ring 49 threaded to the blow pipe and having a horizontally extending flange 50 thereon against the upper face of which the ring 47 bears. In this manner the shaping element 11 is secured to the lower end of the blow pipe.

The glass-shaping element 11 is formed in such a way as to provide a plurality of spaced glass-adherent surfaces over which the glass flows downwardly. The element is preferably in the form of a wire helix having a plurality of turns 11a to 11f, inclusive. This wire is preferably of a heat-resisting metal, such as "nichrome," although it may be of any other suitable material. The turns of this wire forming the shaping element 11 are not all of the same diameter. In the embodiment shown, the diameter progressively increases toward the center of the element (in the vertical direction) and then progressively decreases in diameter toward the bottom end thereof. Where the turns of the element are of varying diameter, the glass which is received on the upper end of the glass-shaping element is diverted radially outwardly of the element as it goes over the upper half thereof and then radially inwardly as it moves over the lower half of the element. This, together with the alternate free flow and interception of the glass, produces intermixing of the glass. This intermixing of the glass is advantageous as it provides greater uniformity of temperature of the glass in any horizontal cross-section and it also provides for a more rapid reduction of the temperature of the glass as it progresses from the upper end to the lower end of the shaping element. This is advantageous from the standpoint of eliminating devitrification. A ring 11g is secured by any suitable means, such as by the weld 11h, to the lowest turn of the helix so that the glass will pass over it after traversing the helix.

It is not necessary to arrange the turns of the helix so as to provide radially inward or radially outward flow of the glass as it passes downwardly thereon. In accordance with my invention, it is merely necessary to provide a plurality of vertically spaced glass-adherent surfaces which will alternately and repeatedly intercept the glass and permit it to flow freely by gravity.

In this specification I have used the term "wire" in describing the shaping element of my invention. This term, of course, is normally used to designate round or flat material, but in the present specification it is used in an even broader sense and includes any and all members whether round, flat or of some other configuration, which may be arranged in the manner described to alternately and repeatedly intercept the glass and permit it to flow freely by gravity.

While I have shown and described one embodiment of my invention, it will be understood that it may be otherwise embodied within the scope of the appended claims.

I claim:

1. In apparatus for forming tubular glassware, means for directing a downward flow of molten glass, a space-enclosing glass shaping element for shaping said molten glass comprising a plurality of vertically spaced glass adherent surfaces over which the molten glass flows successively, said glass adherent surfaces comprising spaced turns of a helix, supporting means for supporting said shaping element in the path of said downwardly flowing molten glass, the shaping element being operatively associated with said first mentioned means for progressively intercepting the downwardly flowing molten glass, and a shaping ring secured to the shaping element below the lowermost of said turns and in position to receive glass discharged from said helical shaping element and to permit it to flow thereover and be discharged therefrom in the form of ware.

2. In tubular glassware forming apparatus, means for directing a downward flow of molten glass, a helical wire glass shaping element having spaced turns and having portions disposed in space-enclosing relation to each other, said shaping element being operatively associated with said first mentioned means for progressively intercepting the downwardly flowing molten glass.

3. In tubular glassware forming apparatus, means for directing a downward flow of molten glass, a helical wire glass shaping element having spaced turns and having portions disposed in space-enclosing relation to each other, said shaping element being operatively associated with said first mentioned means for progressively intercepting the downwardly flowing molten glass and for causing the glass to flow downwardly about each turn in succession along the inside and outside surfaces thereof.

4. In tubular glassware forming apparatus, means for directing a downward flow of molten glass, a refractory member, means for supporting the refractory member in the downwardly flowing stream of glass, a helical wire connected to the refractory member and extending downwardly below the member, the sequential turns of the helical wire being spaced from each other (as measured in a vertical line) for sequentially intercepting the downwardly flowing molten glass.

5. In tubular glassware forming apparatus, means for directing a downward flow of molten glass, a refractory member, means for supporting the refractory member in the downwardly flowing stream of glass, a helical wire operatively associated with the refractory member and extending downwardly below the member, the sequential turns of the helical wire being spaced from each other (as measured in a vertical line) for sequentially intercepting the downwardly flowing molten glass, and means coacting with the refractory member for raising and lowering it to regulate the flow of glass to the helical wire.

6. In tubular glassware forming apparatus, means for directing a downward flow of molten glass, a slender body formed into a helix having a plurality of spaced turns extending about the axis thereof, supporting means for said slender body, said slender body being operatively associated with said first mentioned means for progressively intercepting the downwardly flowing molten glass, whereby intermixing of the glass is effected and the glass is shaped into tubular form as it is discharged from the helix.

7. In tubular glassware forming apparatus, means for directing a downward flow of molten glass, a relatively thin helically shaped body, the turns of which extend circularly and form a space-enclosing structure, said turns being spaced from each other and about the central axis of the helically formed body, means for supporting one end of the helically shaped body in position to locate the axis thereof vertically and to operatively associate the helically shaped body with said first mentioned means, whereby the glass is progressively intercepted as it flows downwardly.

8. In tubular glassware forming apparatus, a thin refractory helical member having its turns arranged to define a space-enclosing structure and spaced from each other about the central axis of said structure, means for supporting the helical member in position to locate the axis of the space-enclosing structure substantially vertically, and means for directing a downward flow of molten glass, said helical member being operatively associated with said second mentioned means for progressively intercepting the downwardly flowing molten glass, whereby the glass is caused to flow successively over the spaced turns.

9. In tubular glassware forming apparatus, means for directing a downward flow of molten glass, a refractory member for receiving the molten glass, a glass shaping element comprising a helical metal wire operatively associated with the refractory member and receiving the glass from the refractory member, the sequential turns of the helical wire being spaced from each other (as measured in a vertical line) for progressively intercepting the downwardly flowing molten glass, and means coacting with the refractory member for raising and lowering it to regulate the flow of molten glass onto the helical wire.

10. In tubular glassware forming apparatus, means for directing a downward flow of molten glass in tubular form, a helical glass shaping element having spaced turns and having portions disposed in space-enclosing relation to each other, said shaping element being operatively associated with said first mentioned means for progressively intercepting the downwardly flowing molten glass, said element also having turns of different diameters to cause portions of the glass to flow between the turns and relative to the axis of the freely flowing tubular molten glass stream as it passes downwardly over said element.

11. In tubular glassware forming apparatus, means for directing a downward flow of molten glass, a slender body in the form of a helix, said helix being operatively associated with said first mentioned means for progressively intercepting the downwardly flowing molten glass, said shaping element having a plurality of turns of different diameters.

12. In tubular glassware forming apparatus, means for directing a downward flow of molten glass, a slender body in the form of a helix having portions disposed in space-enclosing relation to each other, said shaping element being operatively associated with the first mentioned means for progressively intercepting the downwardly flowing molten glass, and a ring secured to the lower end of the helix, said ring being arranged to receive molten glass from the spaced turns of the shaping element.

13. In tubular glassware forming apparatus, means for directing a downward flow of molten glass, and a space-enclosing glass shaping element for shaping said molten glass comprising a plurality of vertically spaced glass adherent surfaces over which the molten glass flows successively, said glass adherent surfaces comprising spaced turns of a helix, said shaping element being operatively associated with said first mentioned means for progressively intercepting the downwardly flowing molten glass, said shaping element having a ring secured to the lowermost turn thereof over which the glass passes as it is discharged from the shaping element.

EDWARD DANNER.

REFERENCES CITED

The following references are of record in the file of this patent:

UNITED STATES PATENTS

| Number | Name | Date |
|---|---|---|
| 1,631,805 | Ferngren | June 7, 1927 |
| 2,212,448 | Modigliani | Aug. 20, 1940 |
| 2,225,369 | Danner | Dec. 17, 1940 |
| 1,631,061 | Rankin | May 31, 1927 |
| 2,181,030 | Thomas | Nov. 21, 1939 |
| 2,215,982 | Slayter et al. | Sept. 24, 1940 |

FOREIGN PATENTS

| Number | Country | Date |
|---|---|---|
| 834,467 | France | Oct. 16, 1938 |